United States Patent [19]

Messing et al.

[11] 4,367,127

[45] Jan. 4, 1983

[54] METALS RECOVERY CELL AND ELECTRODE ASSEMBLY FOR SAME

[75] Inventors: Gilbert S. Messing, Palm Beach, Fla.; Thomas R. Stanford, Monmouth Beach, N.J.; Jean A. Lochet, Metuchen, N.J.; Rajendra B. Patel, Piscataway, N.J.

[73] Assignee: Vanguard Research Associates, Inc., South Plainfield, N.J.

[21] Appl. No.: 278,099

[22] Filed: Jun. 29, 1981

[51] Int. Cl.³ .......................... C25C 1/00; C25C 7/00; C25B 11/12; C25B 11/03
[52] U.S. Cl. ................................. 204/105 R; 204/109; 204/260; 204/263; 204/294; 204/283; 204/237; 204/272
[58] Field of Search ............... 204/260, 272, 261, 263, 204/294, 105 R, 109, 283, 237

[56] References Cited

U.S. PATENT DOCUMENTS

| | | | |
|---|---|---|---|
| 3,330,755 | 7/1967 | Mahany | 204/260 |
| 3,457,152 | 7/1969 | Maloney et al. | 204/272 |
| 4,046,663 | 9/1977 | Fleet et al. | 204/284 |
| 4,177,116 | 12/1979 | De Nora et al. | 204/260 |

Primary Examiner—R. L. Andrews
Attorney, Agent, or Firm—Weingram & Klauber

[57] ABSTRACT

An electrolytic cell for recovering from electrolytes metals, the ionic species of which are present at relatively low concentration. The cell comprises a container for the electrolyte, and and an electrode assembly in the container comprising (1) a tub-tubular sparger, having a central axial cavity bounded by an electrolyte-permeable cylindrical wall, and having an opening for receiving flow of the electrolyte into the central cavity and being otherwise closed, whereby the electrolyte flows radially from the sparger through the cylindrical wall; (2) a first electrolyte-permeable, high surface area electrode, coaxially surrounding the sparger to receive the flow therefrom; (3) an electrically insulating electrolyte-permeable spacer being coaxial with and surrounding the first electrode; and (4) a second electrolyte-permeable electrode being coaxial with the first electrode and contacting the insulating spacer at the side opposed to the first electrode, for receiving and passing the continuing radial flow. Electrical potential means are connected across the first and second electrodes to establish a electrolyzing potential therebetween. Pump means having an inlet for the electrolyte and an outlet connected to the central cavity of the electrode assembly, supplies electrolyte under pressure to the cavity, to thereby enable radial flow from the sparger through the cylindrical wall thereof, and thereupon through the coaxial electrodes and intervening spacer and back to the body of electrolyte within the container. The electrode assembly per se is also claimed.

35 Claims, 1 Drawing Figure

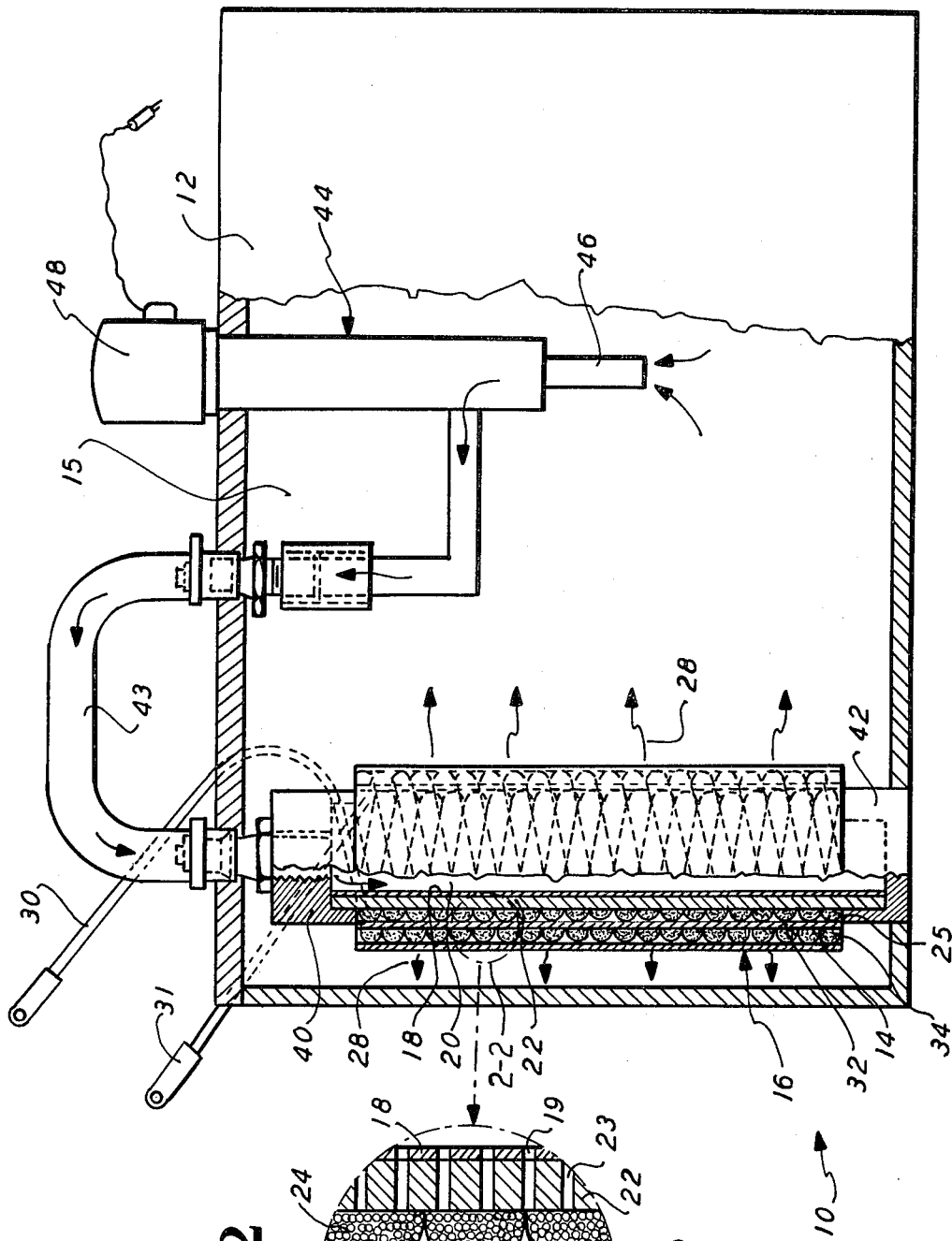

METALS RECOVERY CELL AND ELECTRODE ASSEMBLY FOR SAME

BACKGROUND OF INVENTION

This invention relates generally to electroplating apparatus and methodology, and more specifically, relates to apparatus useful in recovering from electrolytes metals, the ionic species of which are present at relatively low concentrations.

Particularly in the electroplating of precious metals, including especially gold, it has long been of interest to recover from the spent electroplating baths, the relatively low concentrations of gold remaining in same. The interest in such techniques, has of course, greatly intensified within recent years in view of the soaring price of gold. The same intense interest exists, with respect to recovery of other precious metals (e.g. silver), the market price for which have exhibited corresponding increases. It should also be pointed out that interest as well is evident in the recovery of metals which are not normally regarded as "precious," in view especially of increasing prices in these more common metals. Similarly, it should be appreciated that valuable metal species are often sought to be recovered from solutions that have not been used in electroplating—e.g., the silver in photographic baths, or metal species in manufacturing effluents. These solutions can in many instances also be treated by the present invention.

The prior technology applicable to the above field is well illustrated by the techniques presently utilized on a large scale in the gold plating industry. In such industry, the gold drag-out tank typically contains gold in ionic form, at concentrations of the order of 100 ppm or higher. Such electrode solutions are commonly treated with a suitable resin or other compositions; or various mechanical or electromechanical devices have been utilized to recover whatever gold can be gained in that manner.

Thereafter, a further rinse of the modified bath is effected with use of resins. The gold concentration after this stage is often of the order of 20 ppm. A further rinse is often effected with the gold concentrations being brought down to the order of 10 ppm, at which point it is assumed that no further gold can normally be economically recovered.

In the past, apparatus operating on the principles of electrolytic deposition, have been utilized in an effort to electrolyze the relatively dilute solutions as above, to hopefully recover in economic fashion, the gold or other metals remaining therein. One good example of such a device is said forth in U.S. Pat. No. 3,859,195, wherein apparatus for electrochemical processing is disclosed, utilizing a series of concentric extended-surface electrodes. In this device, treatment of the electrolyte is effected by passing same axially through a cylindrical container holding the concentric electrodes. The electrodes preferably comprise corrosion resistant metal filaments, which are fabricated into knitted form.

A further disclosure of interest for present purposes is the electrode structure set forth in U.S. Pat. No. 4,046,663. There a canister holds a plurality of side-by-side graphite fiber tows. The canister carries a series of openings on its lateral surfaces. The electrolyte is fed into the canister and is filtered through the carbon fibers and passes out through the openings in the canister walls. The electrolyte then proceeds through a concentric counter-electrode and then through a spaced outlet. The device functions much like a mechanical canister filter, although it is, of course, electrochemical in nature.

By and large, the prior art devices, while they have achieved a degree of success, have been incapable of effectively and rapidly removing the metals sought to be recovered from the relatively dilute electrolytes. Especially to be noted is that while many of the prior art devices have indeed been capable of recovering the sought after metals when the devices were operated for very sustained periods of time, economics dictate that not only must such a device be capable of removing metals from relatively dilute concentrations of same, but also the removal must be at a sufficiently rapid pace to render the device practical and useful.

SUMMARY OF INVENTION

Now, in accordance with the present invention, an electrolytic cell is provided, which is fully capable of rapidly recovering from electrolytes metals, the ionic species of which are present at relatively low concentrations.

In accordance with the present invention, a cell is provided, which comprises a container for the electrolyte, and an electrode assembly in the container comprising (1) a tubular sparger, having a central axial cavity bounded by an electrolyte-permeable cylindrical wall, said sparger having an opening for receiving flow of the electrolyte into the central cavity and being otherwise closed, whereby the electrolyte flows radially from the sparger through the permeable cylindrical wall; (2) a first electrolyte-permeable, high surface area electrode, coaxially surrounding the sparger to receive the flow therefrom; (3) an electrically insulating electrolyte-permeable spacer being coaxial with and surrounding the first electrode; and (4) a second electrolyte-permeable electrode being coaxial with the first electrode and contacting the insulating spacer at the side opposed to the first electrode, for receiving and passing the continuing radial flow. Electrical potential means are connected across the first and second electrodes to establish a electrolyzing potential therebetween. Pump means having an inlet for the electrolyte and an outlet connected to the central cavity of the electrode assembly, supplies electrolyte under pressure to the cavity, to thereby enable radial flow from the sparger through the cylindrical wall thereof, and thereupon through the coaxial electrodes and intervening spacer and back to the body of electrolyte within the container.

The first of the foregoing electrodes is preferably the cathode, and preferably comprises an electrically continuous tow, which is comprised of multiple carbon (preferably graphitic) filaments. These tows are not per se of the present invention, although with respect particularly to the aforementioned cathode, they are an essential aspect of same. The tows comprise a bundle, including a very large number of graphitized organic precursor fiber filaments. Organic precursor materials, such as rayon or pitch are commonly used as source material for the graphite filaments; but the filaments most often comprise graphitized polyacrylonitrile. These filaments are produced by controlled pyrolysis of organic precursor fibers, e.g. from pyrolysis of PAN yarn or fibers.

In a typical such known process, the PAN yarn is initially heated in an oxidizing atmosphere at temperatures of the order of 200°–250° C., subsequently in a non-oxidizing atmosphere to 1000° C. or above to carbonize the fibers comprising the yarn, and is thereupon subjected to further heating to temperatures of the order of 1000°–2000° C. to graphitize the said materials and produce higher modulus fibers. The graphite fibers which result from the aforementioned process are extremely fine individual filaments, generally having a cross-section from about 10 to about 70 square microns; and in typical tows of the order of 3,000 to 40,000 such filaments will often be present in side-by-side extending fashion in the bundle of filaments, which define the tow. The said graphite filaments display excellent electrical conductivity, which is partially a consequence of the a mode of manufacture, which produces highly organized crystal structures. They also possess outstanding strength characteristics, which is significant for present purposes in enabling the tows to be properly formed into the assemblies used in the invention.

The graphite filament bundles, which comprise the tows are commercial products, which are available from several sources, as for example, under the trademark "Fortafil" from Great Lakes Carbon Corporation, New York, N.Y.; under the trademark "Grafil" from Courtaulds, Carbon Fibres Unit, Coventry, England; and under the trademark "Thornel" from Union Carbide Corporation.

In a preferred type of tow material for use in the present invention, the filaments comprising the tows are coated with a thin layer of electroplated or otherwise deposited nickel, which adds greatly desired properties to the very porous and high surface area electrode. Nickel-plated multi-strand carbon tows of this type are available commerically from MOR-Industrial Co., of Irvington, N.Y.

Tows of the foregoing type, in accordance with the invention, are preferably helically wound about the sparger in solonoidal fashion, whereby the resulting structure is highly porous to the radial flow of electrolyte proceeding outwardly from the sparger, and also present a very high surface area.

The counter-electrode utilized in the present invention, i.e., usually the anode, can comprise a similar electrically continuous tow of multiple carbon filaments. It is also found as a further aspect of the invention, that at least the anode can comprise other relatively high-surface area materials, such as stainless-steel mesh, and still produce effective removal of the sought-after metal species at the cathodic element.

In accordance with an important aspect of the present invention, it has found to be critical to operation of the invention, that an extremely small spacing be provided between the coaxial cathode and anode. Indeed, the cathode-anode spacing will usually be limited by the thickness of the spacer, which preferably comprises a porous membrane or clothlike plastic material, which is electrolyte-permeable and can be formed of such materials as polypropylene filamentary material. The spacing between the anode and cathode is preferably less than 10 mm; excellent results are achieved with spacings in the range of 1 to 2 mm; and in some instances, yet smaller spacings are desirable. In general, the spacing should not exceed about 50 mm—it is clear that when the spacing approaches a relatively high value, such as six inches, the recovery rate for the metal drops off dramatically, thus illustrating the significance of this factor. In essence, the spacing between anode and cathode should be limited by the thickness of the dielectric spacer.

It will be evident that after the metal has been recovered at the graphite-based cathode, the latter may be removed from the electrode assembly and processed in conventional fashion, as for example, by thermal decomposition to recover the metals deposited thereon. Details of such further recovery techniques are well known in the art, and need not be further discussed here.

BRIEF DISCUSSION OF DRAWINGS

The invention in diagramatically illustrated, by way of example, in the drawings appended hereto, in which:

FIG. 1 is a schematic cross-sectional view through a metals recovery cell, in accordance with the present invention; and FIG. 2 is an enlargement of the cross-sectioned portion of the electrode assembly within the dotted circle 2—2 of FIG. 1.

DESCRIPTION OF PREFERRED EMBODIMENT

In FIG. 1, a longitudinal cross-section appears through a metals recovery cell 10, in accordance with the present invention. Cell wall 12 is partially broken away, as is a portion of the external casing 14 of the electrode assembly 16 mounted within the cell; and FIG. 2 is an enlargement of the cross-sectioned portion of electrode assembly 16 within the dotted circle 2—2, so as to set forth details of the various coaxial elements comprising the assembly.

Cell 10 as already discussed, is primarily useful in connection with recovery of metals and particularly of precious metals, such as gold, silver, or the like contained at relatively low concentrations within electrolytes, which may have been previously used in effecting electroplating operations. Thus, the cell 10 may be representively regarded as containing therein an electrolyte 15, which typically can include precious metal ion, such as gold in the form of complexes with cyanides; or other metal ion not necessarily constituting precious metals. The concentration of the metal ion in this type of electrolyte, is often quite low; a typical level can be of the order of 100 ppm, or lower, depending upon the source of the electrolyte.

The most important functional element in the cell 10, is the electrode assembly generally designated at 16. As may be seen by reference to both FIGS. 1 and 2, electrode assembly 16 includes an innermost cylindrical sparger 18, which can comprise a metal cylinder, the walls of which are drilled or otherwise formed with a large number of openings 19 (as large a number as practical) to permit radial flow of electrolytes to proceed from the central axial cavity 20, which is defined within sparger 18, and thus within the central portion of the electrode 16. Surrounding sparger 18, is a dielectric tube or cylinder 22, which again is provided with a large number of perforate openings 23. This tube can also be constituted from a relatively strong plastic material, provided the openings are sufficent to enable radial flow from the sparger. The tube 22 in turn, supports the continuous winding of multi-stranded conductor tow 24, said tow having been previously described and comprising the cathode 25 of the present assembly. As is thus seen in FIG. 2, this tow basically comprises a bundle of a very high number of graphitized filaments 26;

the number can typically, as indicated, run from 3,000 to 40,000.

If the sparger 18 itself comprises a non-conductive material, such as a plastic or the like, then it is possible to dispense with the additional tube 22, and the multi-stranded tow material 24 may be directly wound upon the sparger. Since the tow material is highly porous, being composed of a huge number of filaments lying side by side, the surface area thereof, is relatively enormous; and the cathode 25 is further highly permeable to the electrolyte proceeding radially from the axis of the electrode outwardly in the direction indicated by arrows 28.

It is preferable to make electrical connections to both ends of the continuous helically wound length of the tow; a connector 30 is shown proceeding toward the said cathode element, connections are suitably made at both ends. Because of the nature of the tows, it is preferable to make the electrical connections to same by soldering—as opposed e.g. to crimping.

Immediately overlying (coaxially) the cathode 25 is a very thin dielectric spacer 32, which again as previously described, comprise a mesh-like plastic material or cloth, such as one composed of polypropylene. It is desirable for this material to be as thin as practical, since it will effectively determine or limit the effective spacing between the cathode 25 and the anode 34 which lies on the opposite side of the dielectric spacer 32.

The anode 34 may comprise the exact same conductive multi-stranded tow, which comprises the cathode, and in the embodiment shown in FIG. 1, this is the structure used. However, it is also within the province of the invention for at least the anode to comprise other open-mesh conductive materials, such as very fine stainless-steel mesh. Connection to the anode is made by a connector 31—which again can be connected to both ends of the tow.

The spacing between anode and cathode is critical to the present invention. As shown in FIGS. 1 and 2, it is limited by the thickness of the dielectric spacer 32. Such spacing should preferably be less than 10 mm. Very good results are achieved when the spacing is in the range of 1 to 2 mm., with a typical range being from 1 to 50 mm. The efficiency, and especially the rate of recovery of the metal at the cathode, begins to fall off rather rapidly as the spacing increases beyond about 50 mm.

Finally, there is seen surrounding the conductive tow material comprising the anode, a casing 14, which can comprise a non-conductive material, such as plastic which is provided again with a high number of perforate openings 36 to permit the radial flow proceeding from the interior cavity 20 to finally leave the electrode assembly, as indicated by the arrows 28.

The electrode assembly 16 is closed at the top and bottom by end caps 40 and 42. The only opening for electrolyte to enter the said assembly is provided at the top of same, where it is seen that a conduit 43 provides feed-in of electrolyte to the central cavity 20. The conduit provides electrolyte under pressure from the pump 44, the inlet 46 of which is positioned in the electrolyte, the pump being operated by an electric motor 48. Thus, it is seen that electrolyte under pressure enters interior cavity 20 of the electrode assembly 16, where it proceeds under pressure through the various coaxial elements, finally exiting same as indicated by the arrows 28.

EXAMPLE I

In order to demonstrate the efficacy of apparatus in accordance with the present invention, a recovery cell corresponding to that depicted in FIGS. 1 and 2 was utilized in electrolyzing of a gold-containing electrolyte which initially included gold concentration of 480 ppm. In the said device, the sparger 18 had a diameter of 1 inch, and the overall height of the electrode was approximately 12 inches. The multi-stranded tow material 24 comprising cathode 25 was composed of nickel plated graphite filaments and had a total length (i.e., prior to winding about tube 22) of 7 feet; the approximate surface area was 3.3 square feet per linear inch or about 277 square feet for the entire cathode. A similar material was used for the anode. The potential utilized was approximately 10 to 12 volts and the average current was between 5 to 6 amps. Feed rates through the electrode were of the order of 50 gallons per hour. Under these conditions, it was found that in eight hours of running the cell, the gold concentration dropped from the initial value of 480 ppm to 36 ppm. The cathode/anode gap was approximately 1 millimeter in this arrangement. When the spacing was increased, the rate of gold recovery dropped rapidly when the spacing began to exceed about 50 millimeters. When the spacing reached 6 inches, the device was found to be relatively inefficient. When a stainless-steel mesh was substituted for the multi-stranded tow material at the anode, the device continued to perform relatively well.

EXAMPLE II

This Example further illustrates the effects of anode-cathode spacing on operation of apparatus in accordance with the invention.

Apparatus similar to that used in Example I was thus utilized in electrolyzing a bath which included gold (in ionic form) at an initial concentration of 540 ppm. The anode-cathode spacing was approximately 1 mm. The bath pH was initially measured at 4.0; and no conductivity salts were added. The interelectrode potential was 12 volts and the current 16 amps. In 12 hours, the gold concentration was reduced to 32 ppm. In a second run with otherwise identical apparatus, the anode-cathode spacing was increased to 6 inches. The potential across the electrodes was measured at 20 volts and the current at 1 amp. Gold concentration was initially 540 ppm; after 12 hours it had only been reduced to 325 ppm.

EXAMPLE III

In this Example, apparatus as in FIGS. 1 and 2 was utilized, except that while the cathode comprised the aforementioned tows of nickel-plated graphite filaments, the anode was a stainless-steel mesh. Interelectrode spacing was about 1 mm. Starting with an electrolyte containing gold at a concentration of 440 ppm, a potential of 8 volts was applied across the electrodes, which effected a current of 8 amps. In 9½ hours, the gold concentration was reduced to 320 ppm. In 12 more hours, it was down to 25 ppm; and in 6 additional hours, the gold was substantially all removed. Final potential was 8.2 volts and current was 5 amps.

EXAMPLE IV

Apparatus as in Example IV was used to electrolyze a gold-containing bath to which a conductivity salt (potassium monophosphate) was added at a concentration of 30 g/l. Starting with an interelectrode potential of 9.0 volts and a current of 7 amps, the gold concentration was reduced to less than 1 ppm in only 10 hours.

While the present invention has been particularly described in terms of specific embodiments thereof, it will be understood that numerous variations upon the invention are now enabled to those skilled in the art, which variations yet reside with the scope of the present teaching. Accordingly, the invention is to be broadly construed, and limited only by the scope and spirit of the claims now appended hereto.

We claim:

1. A method for recovering from electrolytes metals, the ionic species of which are present at relatively low concentrations; said method comprising: introducing said electrolyte under pressure into the central cavity of an electrode assembly including at least 2 concentric electrodes which are permeable to said electrolyte in a radial direction, said electrodes being narrowly spaced by an intervening liquid-permeable dielectric, and being provided with an electrolyzing potential therebetween, said electrolyte thereby flowing radially outward from said central cavity through said electrode pair and intervening dielectric spacer to effect electrolytic deposition of the metal species upon the cathodic electrode.

2. A method in accordance with claim 1, wherein at least the cathodic electrode is comprised of a continuous winding of a tow formed from multiple graphitized carbon filaments which are coated with nickel.

3. A method in accordance with claim 1, including adding conductivity salts to the electrolyte prior to electrolyzing of same, in order to decrease the resistivity of the electrolyte so thereby increase the rate of electrolysis thereof.

4. An electrolytic cell for recovering from electrolytes metals the ionic species of which are present at relatively low concentration; said cell comprising:
   a container for said electrolyte;
   an electrode assembly in said container comprising
   (1) a tubular sparger, having a central axial cavity bounded by an electrolyte-permeable cylindrical wall, and having an opening for receiving flow of said electrolyte into said central cavity and being otherwise closed, whereby said electrolyte flows radially from said sparger through said cylindrical wall; (2) a first electrolyte-permeable, high surface area electrode, coaxially surrounding said sparger to receive the flow therefrom; (3) an electrically insulating electrolyte-permeable spacer being coaxial with and surrounding said first electrode; and (4) a second electrolyte-permeable electrode being coaxial with said first electrode and contacting said insulating spacer at the side opposed to said first electrode, for receiving and passing the continuing radial flow;
   electrical potential means connected across said first and second electrodes to establish a electrolyzing potential therebetween; and
   pump means having an inlet for said electrolyte and an outlet connected to the central cavity of said electrode assembly, for suppling electrolyte under pressure to said cavity, to thereby effect said radial flow from said sparger through the cylindrical wall thereof, and thereupon through the said coaxial electrodes and intervening spacer and back to the body of electrolyte within said container.

5. Apparatus in accordance with claim 4, wherein said first electrode is a cathode, and said second electrode is an anode.

6. Apparatus in accordance with claim 5, wherein said cathode comprises an electrically continuous tow comprising multiple carbon filaments.

7. Apparatus in accordance with claim 6, wherein said tow is helically wound about said sparger in solonoidal fashion.

8. Apparatus in accordance with claims 5, 6 or 7, wherein said anode comprises an electrically continuous tow of multiple carbon filaments.

9. Apparatus in accordance with claims 5, 6 or 7, wherein said anode comprises an electrically continuous tow of multiple carbon filaments which is helically wound about said spacer in solonoidal fashion.

10. Apparatus in accordance with claims 6 or 7, wherein said filaments of said cathode are coated with nickel.

11. Apparatus in accordance with claim 7, wherein said spacer comprises an electroyte-permeable plastic fabric.

12. Apparatus in accordance with claim 7, wherein the cathode to anode spacing is less than 10 mm.

13. Apparatus in accordance with claim 7, wherein said anode comprises a stainless-steel mesh.

14. Apparatus in accordance with claim 7, wherein the negative side of said potential means is connected to both ends of the tow comprising said cathode.

15. Apparatus in accordance with claim 7, further including an electrolyte-permeable insulating cylinder coaxially surrounding said anode to provide mechanical integrity for said electrode.

16. Apparatus in accordance with claim 7, including an electrolyte-permeable insulating cylinder coaxially surrounding said sparger, said anode comprising an electrically continuous tow of multiple carbon filaments and being helically wound upon the outward surface of said insulating cylinder.

17. An electrode assembly for use in an electrolytic cell for recovering from electrolytes metals, the ionic species of which are present at relatively low concentration; and assembly comprising:
   (1) a tubular sparger, having a central axial cavity bounded by an electrolyte-permeable cylindrical wall, said sparger having an opening for receiving pressurized flow of said electrolyte into said central cavity and being otherwised closed, whereby said electrolyte flows radially from said sparger through said cylindrical wall;
   (2) a first electrolyte-permeable, high surface area electrode, coaxially surrounding said sparger to receive the flow therefrom;
   (3) an electrically insulating electrolyte-permeable spacer being coaxial with and overlying said first electrode; and
   (4) a second electrolyte-permeable electrode being coaxial with said first electrode and contacting said insulating spacer at the side opposed to said first electrode, for receiving and passing the continuing radial flow back to the cell containing said assembly.

18. A device in accordance with claim 17, wherein said first electrode is a cathode and comprises an electrically continuous tow comprising multiple carbon filaments.

19. A device in accordance with claim 18, wherein said tow is helically wound about said sparger in solonoidal fashion.

20. A device in accordance with claims 17, 18, or 19, wherein said second electrode is an anode and comprises an electrically continuous tow of multiple carbon filaments.

21. A device in accordance with claims 17, 18, or 19, wherein said second electrode is an anode and comprises an electrically continuous tow of multiple carbon filaments which is helically wound about said spacer in solonoid-fashion.

22. A device in accordance with claim 18, wherein said spacer comprises an electrolyte-permeable plastic fabric.

23. A device in accordance with claim 18 and 19, wherein said carbon filaments are coated with nickel.

24. A device in accordance with claim 18, wherein the cathode to anode spacing is less than 10 mm.

25. A device in accordance with claim 19, wherein said anode comprises a stainless-steel mesh.

26. A device in accordance with claim 19, wherein the negative side of said potential means is connected to both ends of the tow comprising said cathode.

27. A device in accordance with claim 19, further including an electrolyte-permeable insulating cylinder coaxially surrounding said anode to provide mechanical integrity for said electrode.

28. A device in accordance with claim 19, including an electrolyte-permeable insulating cylinder coaxially surrounding said sparger, said tow being helically wound upon the outward surface of said cylinder.

29. An electrode assembly for recovering low concentrations of metal species from an electrolyte, comprising: a cylindrical cathode and a coaxial cylindrical anode separated from said cathode by a thin intervening dielectric; said dielectric and the cylindrical walls of said anode and cathode being permeable to said electrolyte; an axially-extending cavity being defined within said assembly and communicating with said cylindrical walls and intervening dielectric; and an inlet to said cavity for flowing said electrolyte thereto, whereby electrolyte introduced under pressure to said cavity flows radially from said assembly via said cathode and anode wall and the intervening dielectric, and may be electrolyzed by a potential applied between the said electrodes.

30. A device in accordance with claim 3, wherein said cathode comprises a helically wound tow of multiple graphite filaments.

31. A device in accordance with claim 29, wherein said filaments are plated with nickel.

32. A device in accordance with claim 29 or 30, wherein said anode comprises a helically wound tow of multiple graphite filaments.

33. A device in accordance with claim 29 or 30, wherein said anode comprises a stainless-steel mesh.

34. A device in accordance with claim 29 or 30, wherein the spacing between anode and cathode is less than 10 mm.

35. A device in accordance with claim 29 or 30, wherein the spacing between anode and cathode is in the range of 1 to 2 mm.

* * * * *